United States Patent
Keefer et al.

(10) Patent No.: US 7,730,174 B2
(45) Date of Patent: Jun. 1, 2010

(54) SYSTEM AND METHOD FOR AGENT-BASED MONITORING OF NETWORK DEVICES

(75) Inventors: Billy Keefer, Reading (GB); Aldis T. Fu, Queens Village, NY (US)

(73) Assignee: Computer Associates Think, Inc., Islandia, NY (US)

( * ) Notice: Subject to any disclaimer, the term of this patent is extended or adjusted under 35 U.S.C. 154(b) by 0 days.

(21) Appl. No.: 10/759,705

(22) Filed: Jan. 15, 2004

(65) Prior Publication Data

US 2005/0015485 A1 Jan. 20, 2005

Related U.S. Application Data

(60) Provisional application No. 60/483,483, filed on Jun. 27, 2003.

(51) Int. Cl.
*G06F 15/173* (2006.01)

(52) U.S. Cl. .................................. 709/224; 709/223

(58) Field of Classification Search ......... 709/223–225, 709/217–219, 203, 226, 200; 370/242–245
See application file for complete search history.

(56) References Cited

U.S. PATENT DOCUMENTS

| | | | | |
|---|---|---|---|---|
| 5,546,595 | A | * | 8/1996 | Norman et al. ............... 710/10 |
| 5,696,486 | A | | 12/1997 | Poliquin et al. |
| 5,781,703 | A | * | 7/1998 | Desai et al. .................. 706/50 |
| 5,819,028 | A | | 10/1998 | Manghirmalani et al. |
| 5,974,237 | A | | 10/1999 | Shurmer et al. |
| 5,974,457 | A | | 10/1999 | Waclawsky et al. |
| 5,995,916 | A | * | 11/1999 | Nixon et al. ................ 702/182 |
| 5,996,010 | A | | 11/1999 | Leong et al. |
| 6,061,724 | A | * | 5/2000 | Ries et al. ................... 709/224 |
| 6,085,243 | A | | 7/2000 | Fletcher et al. |
| 6,119,159 | A | | 9/2000 | Tseng et al. |
| 6,145,001 | A | | 11/2000 | Scholl et al. |
| 6,167,446 | A | * | 12/2000 | Lister et al. ................. 709/223 |
| 6,243,756 | B1 | | 6/2001 | Whitmire et al. |
| 6,308,207 | B1 | | 10/2001 | Tseng et al. |
| 6,327,677 | B1 | | 12/2001 | Garg et al. |
| 6,349,306 | B1 | * | 2/2002 | Malik et al. ............. 707/103 R |
| 6,353,884 | B1 | * | 3/2002 | Schmitz et al. ................ 713/1 |
| 6,360,277 | B1 | * | 3/2002 | Ruckley et al. ............. 709/250 |
| 6,370,572 | B1 | | 4/2002 | Lindskog et al. |
| 6,510,454 | B1 | | 1/2003 | Walukiewicz |
| 6,529,877 | B1 | * | 3/2003 | Murphy et al. .................. 705/7 |
| 6,697,962 | B1 | * | 2/2004 | McCrory et al. .............. 714/27 |
| 6,738,813 | B1 | * | 5/2004 | Reichman .................... 709/224 |

(Continued)

FOREIGN PATENT DOCUMENTS

EP 1 320 217 A1 6/2003

(Continued)

*Primary Examiner*—Karen C Tang
(74) *Attorney, Agent, or Firm*—Pillsbury Winthrop Shaw Pittman LLP

(57) ABSTRACT

A method and system for monitoring network devices are provided. In one embodiment, a method for agent-based monitoring of network devices includes selecting a network device from an enterprise network. An agent template is selected based on the selected network device. An agent object is instantiated based on the agent template. The agent object is operable to monitor hardware characteristics of the network device.

19 Claims, 7 Drawing Sheets

U.S. PATENT DOCUMENTS

| | | | |
|---|---|---|---|
| 6,795,403 B1 * | 9/2004 | Gundavelli | 370/256 |
| 6,816,898 B1 * | 11/2004 | Scarpelli et al. | 709/224 |
| 6,842,781 B1 * | 1/2005 | Lavian et al. | 709/223 |
| 7,139,693 B1 * | 11/2006 | Dake et al. | 703/24 |
| 7,451,071 B2 * | 11/2008 | Ferguson et al. | 703/22 |
| 2003/0167323 A1 * | 9/2003 | Motoyama et al. | 709/223 |

FOREIGN PATENT DOCUMENTS

| | | |
|---|---|---|
| EP | 1 367 766 A2 | 12/2003 |
| WO | WO 01/91369 | 11/2001 |

* cited by examiner

US 7,730,174 B2

SYSTEM AND METHOD FOR AGENT-BASED MONITORING OF NETWORK DEVICES

RELATED APPLICATION

This application claims the priority under 35 U.S.C. §119 of provisional application Ser. No. 60/483,483 filed Jun. 27, 2003.

TECHNICAL FIELD

This disclosure relates generally to the field of networks, and more particularly to a system and method for agent-based monitoring of network devices.

BACKGROUND

Communication networks rapidly convey large amounts of information typically in the form of frames or packets to remote points. Such networks may include a number of apparatuses such as switches, bridges, routers, computers, printers, servers, databases, or other such devices. Network management systems have become necessary to facilitate the management of communication systems especially as they have grown in size. Conventional management systems typically do not provide the ability to monitor hardware characteristics of a network device.

SUMMARY

A method and system for monitoring network devices are provided. In one embodiment, a method for agent-based monitoring of network devices includes selecting a network device from an enterprise network. An agent template is selected based on the selected network device. An agent object is instantiated based on the agent template. The agent object is operable to monitor hardware characteristics of the network device.

DESCRIPTION OF EXAMPLE EMBODIMENTS

Figure 1:
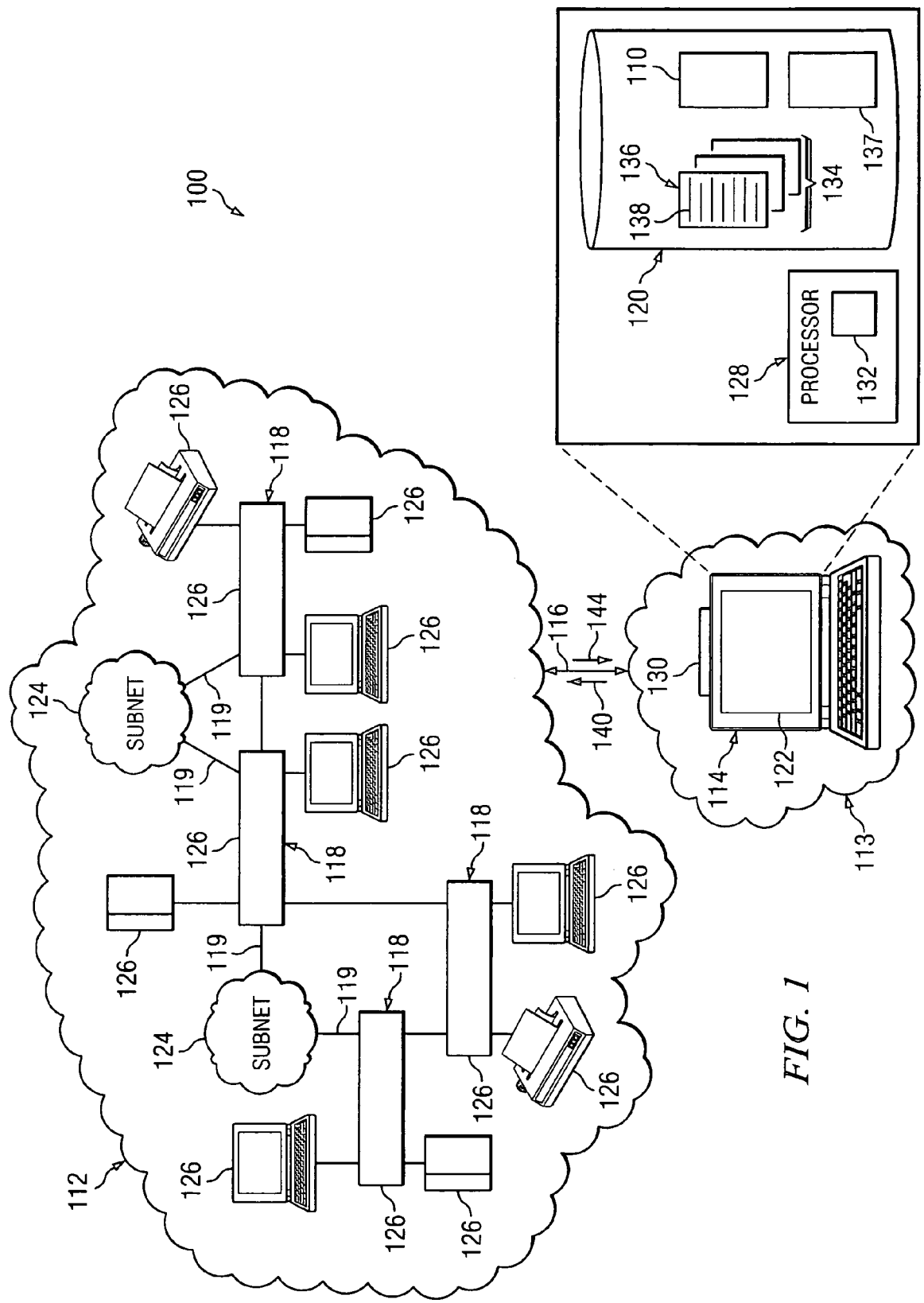
FIG. 1 is a block diagram illustrates an exemplary communication system including a network monitoring system.

FIG. 1 illustrates one embodiment of a monitoring system 100 that uses an agent object 110 to monitor multiple devices in a communication network. At a high level, communication system 100 includes a network 112 and a monitoring system 113 coupled via a link 116. Link 116 may comprise a plurality of discrete wireless and/or wireline links.

Network 112 communicates information between source and destination point. The sources and/or destination may be in network 112 or external to the network. Within the network, information may be communicated on wireless and/or wireline links between network devices. Network 112 may include one or more subnetworks, LANs, radio access networks (RANs), metropolitan area networks (MANs), wide area networks (WANs), all or a portion of the global network known as the internet, and/or any other communication system or systems at one or more locations. Network 112 may communicate, for example, internet protocol (IP) packets, frame relaying frames, a synchronous transfer mode (ATM) cells, voice, video, data, and other suitable information between network addresses. It will be understood that network 112 may comprise TCP/IP, IPX, SNA, DEL net, or other suitable networks.

In the illustrated embodiment, network 112 includes a plurality of subnetworks ("subnets") 124 and a plurality of network devices 126. Network devices 126 may include switches, routers, hubs, computers, printers, servers, data storage devices, or other suitable network devices. Furthermore, each network device 126 includes associated hardware characteristics. Hardware characteristics may include, where appropriate, chassis temperature, CPU usage, memory usage, fan status, module status, power supply status, a combination of the foregoing, or any other information associated with the physical characteristics of a network device 126. Subnets 124 comprise segments of network 112 coupled via bridging ports 119 of switches 118. Subnets 124 may include routers, bridges, switches, repeaters, computers, data storage devices, servers, and other devices operable to communicate in a communication network. Switches 118 are operable to pass traffic between subnets 124 over bridging ports 119. Bridging ports 119 may be any suitable type of wireline or wireless link capable of passing traffic between subnets 124. In one embodiment, bridging ports 119 include a wireline link capable of passing traffic between subnets 124, wherein subnets 124 include a plurality of LAN segments. Each subnet 124 may comprise the same or different topologies as other subnets 124, such as bus, ring, tree, star, or other suitable topologies operable to pass information between end stations.

Monitoring system 113 monitors network 112. Monitoring system 113 may query, receive data from, store configuration information and other data for and send communication to network 112. While monitoring system 113 is illustrated as disparate from network 112, network 112 may include monitoring system 113. Monitoring system 113 may comprise a plurality of network devices 126 operable to monitor other network devices 126 in network 112. For example, monitoring system 113 may comprise a plurality of monitoring computers. In the illustrated embodiment, monitoring system 113 includes monitoring computer 114.

Monitoring computer 114 includes graphical user interface (GUI) 122, network interface 130, a memory 120, and a processor 128. The present disclosure also includes an agent template repository 134 and agent object 110 that may be stored in memory 120 and may be executed or processed by processor 128. FIG. 1 only provides one example of a computer that may be used with the disclosure. The present disclosure contemplates computers other than general purpose computers as well as computers without conventional operating systems. As used in this document, the term computer is intended to encompass a personal computer, a workstation, network computer, mainframe, or any other suitable processing device. Monitoring computer 114 may be adapted to execute any operating system including UNIX, Windows or any other suitable operating system.

GUI 122 comprises a graphical user interface operable to allow the user of monitoring computer 114 to monitor network 112. Generally, GUI 122 provides the user of monitoring computer 114 with an efficient user-friendly presentation of data provided by monitoring computer 114 or network 112. GUI 122 may comprise a plurality of displays having interactive fields, pull-down lists, and buttons operated by the user. In one example, GUI 122 presents an explorer-type interface and receives commands from the user. It should be understood that the term graphical user interface may be used in the singular or the plural to describe one or more graphical user interfaces in each of the displays of a particular graphical user interface. Furthermore, GUI 122 contemplates any graphical user interface that processes information in computer 114 and efficiently presents the information to the user.

Network interface 130 may facilitate communication with network 112, including switches 118 in network 112. In certain embodiments, computer 114 may generate a request to at least one of the switches 118 in network 112 for information associated with the at least one of the switches 118. Interface 130 calibrates the transmission of these requests and the reception of responses to these requests. Generally, interface 130 comprising the logic encoded in software and/or hardware in a suitable combination and operable to communicate with network 112 via the link 116. More specifically, interface 130 may comprise software supporting one or more communications protocols associated with link 116 and network 112 hardware operable to communicate physical signals.

Memory 120 may include any memory or database module and may take the form of volatile or non-volatile memory including, without limitation, magnetic media, optical media, Random Access Memory (RAM), Read-Only Memory (ROM), removable media, or any other suitable local or remote memory or storage component. In this embodiment, memory 120 includes at least agent template repository 134, agent object 110, and class network device table 137 but may also include any other appropriate data. Agent template repository 134 stores one or more agent templates 136. Agent template repository 134 may receive agent template 136 through interface 130 or from another process running on computer 114. Repository 134 may be any suitable format including XML documents, flat files, comma-separated-value (CSV) files, SQL tables, relational database tables, and any other format operable to store at least one agent template 136.

Agent template 136 is associated with at least one network device 126 based on any appropriate characteristics. For example, computer 114 may associate agent template 136 based on a type of network device 126, identity of vendor, model number, product line, hardware characteristics, or any other suitable information associated with selected network device 126. As used herein, select means to initiate communication with, initiate retrieval of, or otherwise identify. Agent template 136 may comprise a file, script, executable, template or any other suitable description such that chassis generation engine 132 may instantiate an agent object 110 for each selected network device 126. In one embodiment, agent template 136 includes source code written in any appropriate language such as, for example, C, C++, Java, Perl, Visual Basic, and others. Agent template 136 may be created by computer 114, a third party software vendor, or any other suitable user of any computer in system 100 or loaded from a default template. Agent template 136 may be in any electronic format such as, for example, an XML document or any other appropriate format. In short, agent template 136 comprises any file including at least one agent construct 138. Each agent construct 138 comprises class definitions from which chassis monitoring engine 132 instantiates agent object 110. In one embodiment, agent constructs 138 includes a class hierarchy with a parent class and one or more associated child classes. For example, the parent class may comprise a type of network device with child classes comprising hardware characteristics of the type of network device.

Based upon agent template 134, computer 114 instantiates at least one agent object 110. Agent object 110 comprises any software component operable to monitor information associated with a selected network device 126 in network 112. In certain embodiments, agent object 110 may be an instantiated object based on a class defined in an appropriate object-oriented programming language. For example, agent object 110 may be based, at least in part, on classes written in C++, Java, or any other suitable language. In one embodiment, agent object 110 may be operable to generate requests 142 to be transmitted to a selected switch 118, receive responses 144 from the selected switch 118, process responses 144, update data stored in memory 120 where appropriate, and communicate processed data to user of computer 114. Computer 114 may use Simple Network Management Protocol (SNMP) to request Management Information Base (MIB) objects from switches 118 in network 112. The MIB object is a sequence of numbers that identifies the type of apparatus and may include the identity of the vendor, hardware characteristics, or other suitable information. SNMP requests are typically encoded into protocol data units (PDUs) and sent to the SNMP agent layer over a TCP/IP. Agent object 110 receives, decodes, and filters SNMP get-responses and trap PDUs from the agent layer and stores this information in memory 120. In one embodiment, agent object 110 compares information associated with a selected network device 126 to an associated threshold value. In response to the associated information violating the threshold value, agent object 110 automatically communicates an alert to the user of computer 114 via GUI 122. The term "automatically," as used herein, generally means that the appropriate processing is substantially performed by system 100. For example, if CPU usage exceeds a default threshold or a threshold set by the user of computer 114, GUI 122 automatically displays a flashing graphical LED.

Class network device table 137 comprises a list of classes of network devices 126 discovered in network 112, which is stored in memory 120, and used to construct agent object 110. Class network device table 137 may be created by computer 114, a third party, or any other suitable user of any computer in system 100 or loaded from a default table. Table 137 may be any suitable format including XML documents, flat files, CSV files, SQL tables, relational database tables, or others.

Processor 128 executes instructions and manipulates data to perform operations of management computer 114, such as chassis monitoring engine 132. Although FIG. 1 illustrates a single processor 128 in computer 114, multiple processors 128 may be used according to particular needs, and reference to processor 128 is meant to include multiple processors 128 where applicable. In the illustrated embodiment, computer 114 includes chassis monitoring engine 132 which monitors switches and instantiates agent object 110 based on agent template 136. In one embodiment, chassis monitoring engine 132 may control the discovery of managed objects in network 112, create a managed object list in class network device table 137, and keep state information in repository 134 current by controlling logic that converts trapped data, responses to polls, and user input into object state changes. Chassis monitoring engine 132 may include any hardware, software, firmware, or combination thereof operable to generate at least one agent object 110. It will be understood that chassis monitoring engine 132 is illustrated as a single multi-task module, the features in functionality performed by this engine may be performed by multiple modules.

In one aspect of operation, a user of computer 114 selects a network device 126 in network 112 via GUI 122. Chassis monitoring engine 132 may initially determine if the selected network device 126 exists in table 137. If so, chassis monitoring engine 132 loads an agent template 136 associated with the selected network device 126 at least partially based on table 137. Chassis monitoring engine 132 instantiates agent object 110 based on the loaded agent template 136 and selected network device 126.

Once instantiated, agent object 110 generates requests for information associated with the selected network device 126. In one embodiment, agent object 110 generates requests for updates to the hardware characteristics associated with the selected network device 126. In the illustrated embodiment, chassis monitoring engine 132 translates these requests into an SNMP request 142 and transmits it over network 112. Chassis monitoring engine 132 receives and translates SNMP responses 144 and forwards the response to agent object 110. It will be understood that system 100 may utilize any appropriate technique for transmitting requests 142 and receiving response 144 from the selected network device 126. Once the data has been received and processed, agent object 110 may communicate the data or information associated with the selected network device 126 to the user of computer 114 via GUI 122, as appropriate.

Figure 2A:
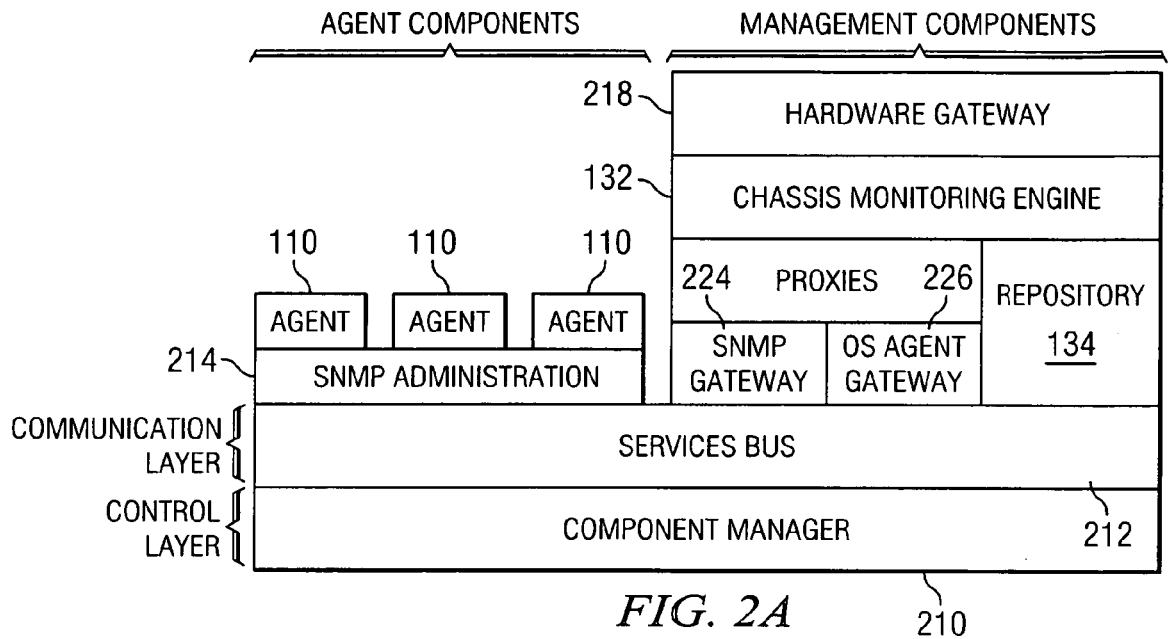
FIG. 2A is a block diagram illustrating an exemplary implementation of FIG. 1.

FIG. 2A illustrates one embodiment of implementing monitoring system 100. In the illustrated embodiment, monitoring system 100 includes a control and communication layer and management and agent components. The control layer includes a component manager 210 that controls other components in the monitoring system 100. The communication layer includes a services bus 212 that is responsible for the majority of the communication between the components of monitoring system 100. The agent components include an SNMP administrator 214 and agents 110. SNMP administrator 214 is responsible for receiving SNMP requests and supplying results, where appropriate.

Management components include hardware gateway 218, chassis monitoring engine 132, repository 134, SNMP gateway 224, and Operating System (OS) agent gateway 226. Repository 134 stores the managed object class definitions and provides them on request usually to chassis monitoring engine 132 and for any other object store client. In this embodiment in which repository 134 comprises agent template 136, chassis monitoring engine 132 may control the discovery of managed objects in network 112, create a managed object list in repository 134, and keep state information in repository 134 current by controlling logic that converts trapped data, responses to polls, and user input into object state changes. SNMP gateway 224 manages communications with network devices 126 in network 112 that are operable to receive and transmit SNMP. SNMP gateway 224 may receive messages across service bus 212 from other components, encode these messages into SNMP PDUs and transmit them to the SNMP agent layer of the selected network device 126 over network 112. SNMP gateway 224 may also receive and decode SNMP "get-response" and "trap" PDUs from the agent layer, filter them, and put the rest onto service bus 212. Hardware gateway 218 may be an application program inferface (API) that manages the communication between repository 134 and chassis monitoring engine 132. Hardware gateway 218 may provide chassis monitoring engine 132 with a filtered list of devices to manage and supply repository 134 with the state of these devices.

Figure 2B:
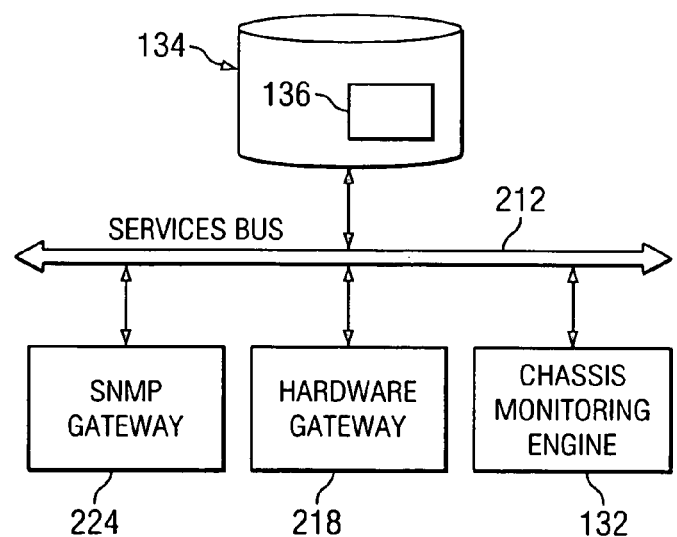
FIG. 2B is a block diagram illustrating an example portion of the system for instantiating an agent object illustrated in FIG. 1.

FIG. 2B illustrates a block diagram illustrating instantiation of agent object 110. In the illustrated embodiment, agent template 136 is loaded into repository 134 and comprises managed object class definitions written in text files. In this embodiment, agent template 136 comprises a basic class hierarchy including network addressable unit (NAU) classes, agent level classes, group level classes, and instance level classes. It will be understood that agent templates 136 may be organized in any other suitable manner such that chassis monitoring engine 132 may instantiate agent object 110. NAU classes may comprise the actual classes of network devices 126 discovered in network 112 (i.e., Router: type; Switch: type, etc.). Agent level classes may comprise a root class defined within agent template 136. Its class declaration may include a parent clause that lists the NAU classes. In this embodiment, chassis monitoring engine 132 may only poll objects classified as a NAU class, as specified within this parent clause. Group level classes may comprise child classes of an agent level class and may be used to logically group instance level classes. Instance level classes represent actual objects being managed. All agent level class definitions are typically stored in one agent template 136 but, in certain embodiments, may be split into two or more agent templates 136. Each agent template 136, in the illustrated embodiment, comprises an agent level class including a declaration of parents. Based upon the declaration, the agent level class is built into a parent/child relationship object that is stored in repository 134.

In one aspect of operation, hardware gateway 218 connects to repository 134 to retrieve a list of NAU objects and their classes. This list may be filtered depending on whether the objects may be managed by computer 114. The name and class of the NAU objects are then passed to chassis monitoring engine 132. Chassis monitoring engine 132 locates managed object class definitions for a particular class in an agent template 136 and creates an instance of the object, such as agent object 110. In particular, when chassis monitoring engine 132 has instantiated a NAU level class object, engine 132 uses the parent/child relationship stored in repository 134 to determine which agent class should be instantiated and creates an instance of each class.

Figure 3A:
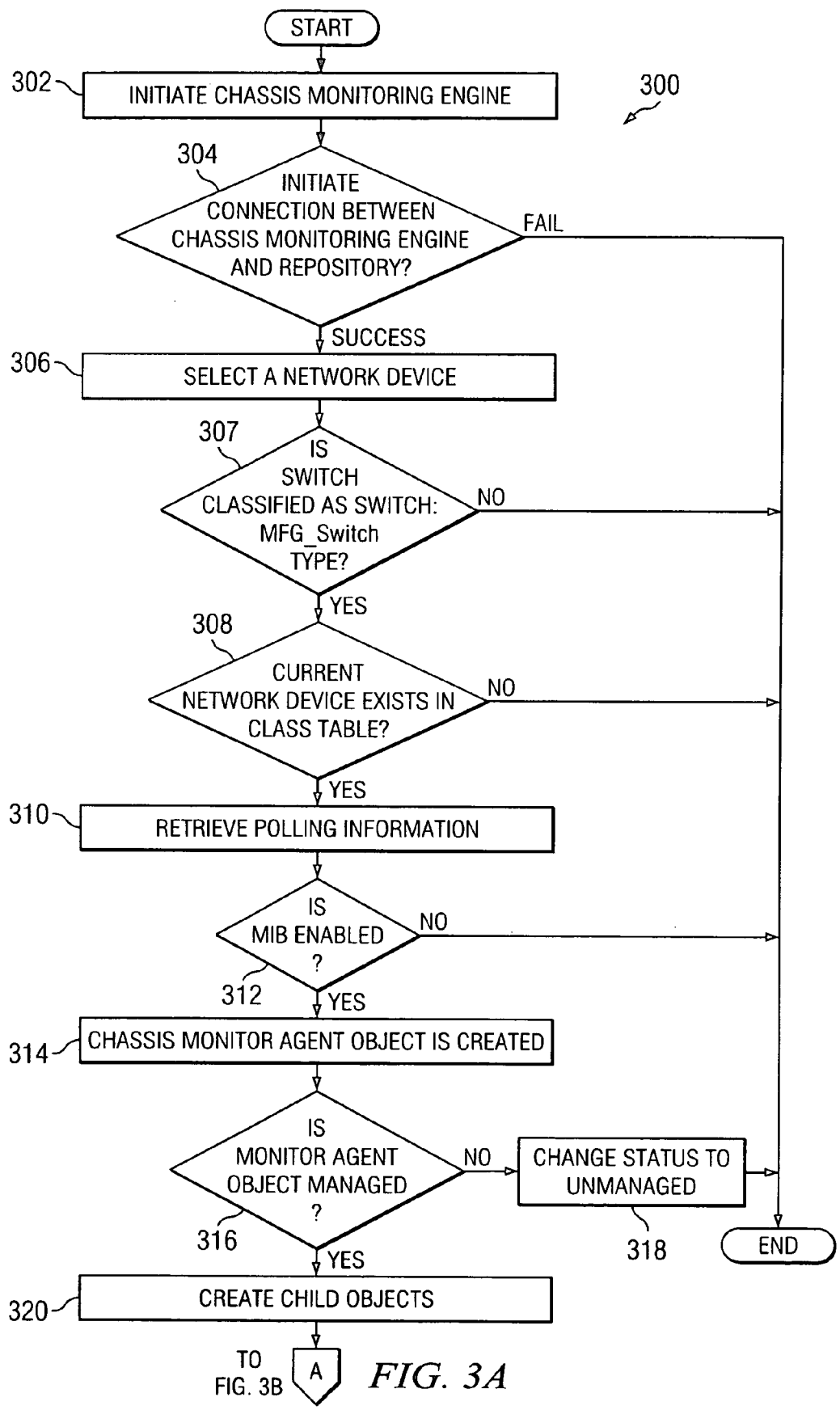
FIGS. 3A-B are flow diagrams illustrating an example method for monitoring information associated with network devices.
Figure 3B:
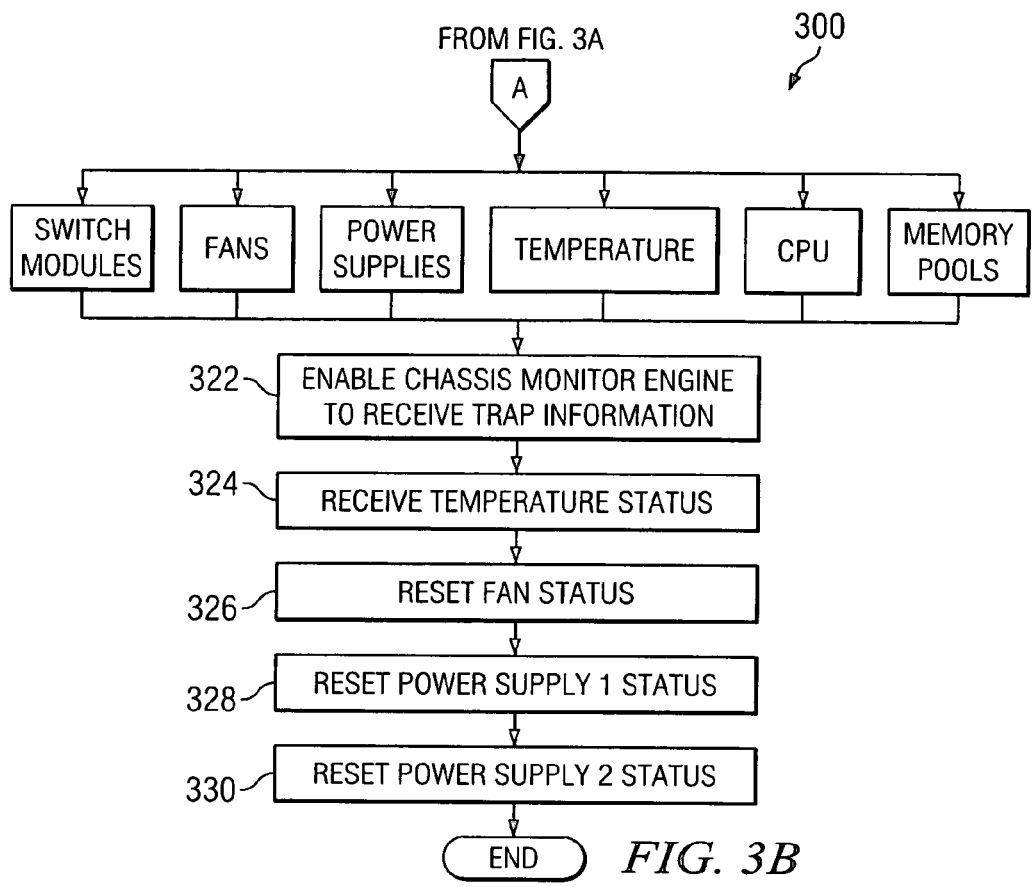

FIG. 3 is an exemplary flow diagram illustrating an example method 300 for monitoring a selected network device 126 according to one embodiment of this disclosure. Method 300 is described with respect to monitoring system 100 of FIG. 1, but method 300 could also be used by any other system. Moreover, system 100 may use any other suitable technique for performing these tasks. Thus, many of the steps in this flowchart may take place simultaneously and/or in different orders than as shown. For example, method 300 may be performed by system 100 for a plurality of switches 118 either in parallel or concurrently. Moreover, system 100 may use methods with additional steps, fewer steps, and/or different steps, so long as the methods remain appropriate.

Method 300 begins at step 302 where chassis monitoring engine 132 is initiated. Next, at step 306, a connection is initiated between chassis monitoring engine 132 and agent template repository 134. If the connection fails between chassis monitoring engine 132 and repository 134, then processing ends. If the connection is successful, then in one embodiment, at step 306, switch 118 is selected to be monitored. At decisional step 307, chassis monitoring engine 132 determines if selected switch 118 is classified as SWITCH:MFG_Switch, which may identify the respective manufacturer, such as Cisco, of switch 118. If selected switch 118 is not classified as SWITCH:MFG_Switch, then processing for particular switch 118 ends. Otherwise, at decisional step 308, chassis monitoring engine 132 determines whether the selected switch 118 exists in class switch table 137, which comprises a list of switches discovered in network 112 and stored in memory 120. If the current switch does not exist in the class switch table, then processing ends. If the current switch exists in the class switch table, then polling information is retrieved from memory 120 at step 310. Next, at decisional step 312, chassis monitoring engine 132 determines if the MIB of the selected switch 118 is enabled. In one embodiment, chassis monitoring engine 132 reads the parent clause in agent template 136 referred to in FIG. 2B to determine if the selected switch 118 matches one of the listed NAU classes and thus indicating MIB enablement. If the MIB is not enabled, then processing ends. If the MIB is enabled, then chassis monitoring engine 132 instantiates agent object 110 at step 314. Chassis monitoring engine 132 determines whether the selected switch 118 is managed by managed computer 114 at decisional step 316. For example, chassis monitoring engine 132 may check an "admin_status" property, which is synchronized with memory 120, of agent object 110 to determine if current switch 118 is managed or unmanaged. If the selected switch 118 is not managed, then the status of the selected switch 118 is changed to "Unmanaged" at step 318 and then processing ends. If the selected switch 118 is managed, then chassis monitoring engine 132 instantiates child objects at step 320. Child objects may include a switch module object, a fan object, power supply objects, a temperature object, a CPU object, a memory pool object, or any combination thereof. At step 322, chassis monitoring engine 132 is enabled to receive trap information from the selected switch 118. Next, at step 324, management computer 114 receives temperature status. Fan status is reset at step 326 and power supply one and two statuses are reset at steps 328 and 330, respectively.

FIGS. 4A through 4E are exemplary flow diagrams illustrating example child objects referred to in FIG. 3. Methods illustrated in FIGS. 4A through 4E are described with respect to system 100 illustrated in FIG. 1, but these methods could also be used by any other system. Moreover, the child objects may use any suitable technique for performing these tasks. Thus, many of the steps in these flowcharts may take place simultaneously and/or in different orders than as shown. Further, the child objects may use methods with additional steps, fewer steps, and/or different steps, so long as the methods remain appropriate. This disclosure contemplates that system 100 may process the techniques represented in these methods either serially or in parallel, as appropriate.

Figure 4A:
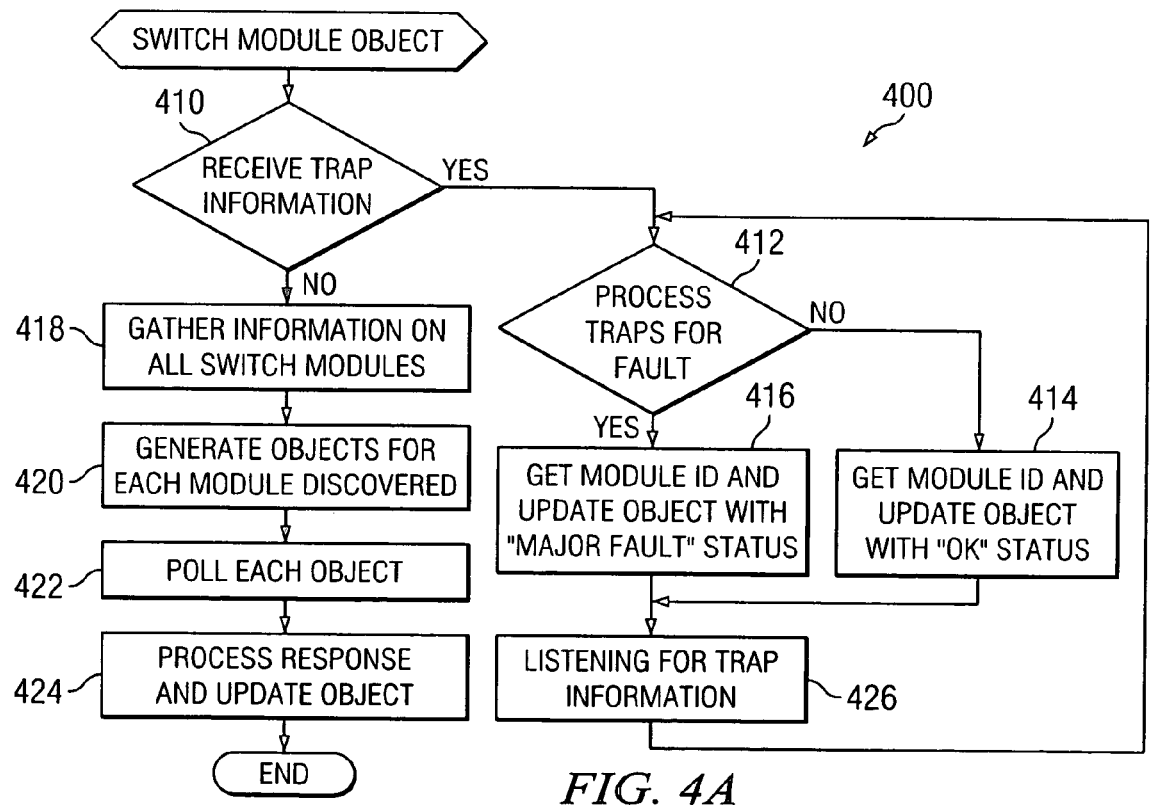
FIGS. 4A-F are exemplary flow diagrams illustrating example methods for monitoring information associated with hardware characteristics of a network device.

FIG. 4A illustrates the switch module object executing example method 400. Method 400 begins at step 410 where switch module object receives trap information from the selected switch 118. At decisional step 412, switch module object determines whether the received trap information indicates a fault. If the trap information does not indicate a fault, then, at step 414, switch module object gets module ID and updates object with "Okay" status. If a fault is detected, then, at step 416, switch module object gets module ID and updates object with "Major Fault" status. After updating the object with current switch status, at step 417, chassis monitoring agent may continuously listen to trap information sent to selected switch 118 and process trap at step 412 until monitoring is manually or automatically terminated. At step 418, switch module object gathers information on all switch modules of the selected switch 118. Switch module object generates objects for each module discovered at the selected switch 118. At step 422, each object is then polled. Switch module object processes responses from the selected switch 118 and updates all corresponding objects at step 424.

Figure 4B:
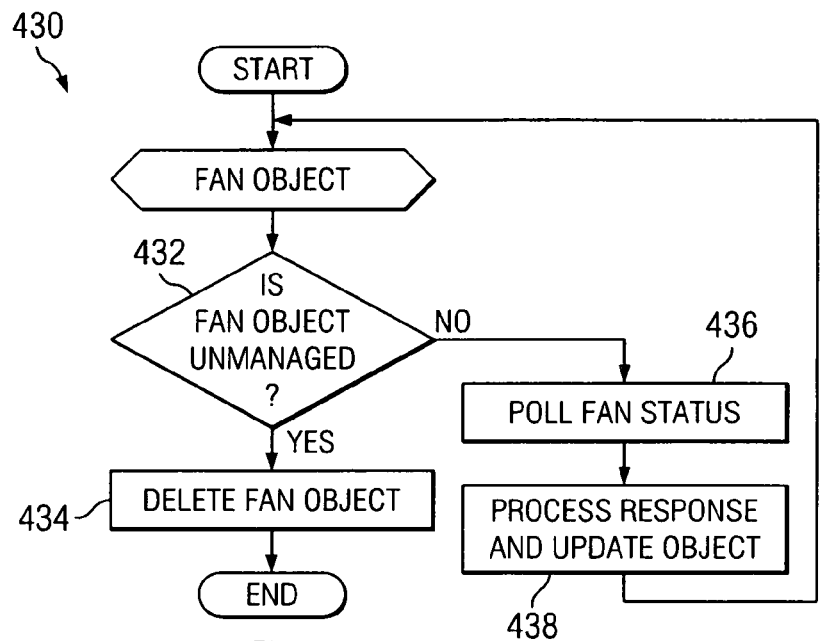

FIG. 4B illustrates the fan object executing example method 430. At decisional step 432, chassis monitoring engine 132 determines whether the fan object is unmanaged. If the fan object is unmanaged, then the fan object is deleted at step 434. If the fan object is managed, then the fan status of the selected switch 118 is polled at step 436. The fan object processes the response from the selected switch 118 and updates the object at step 438.

Figure 4C:
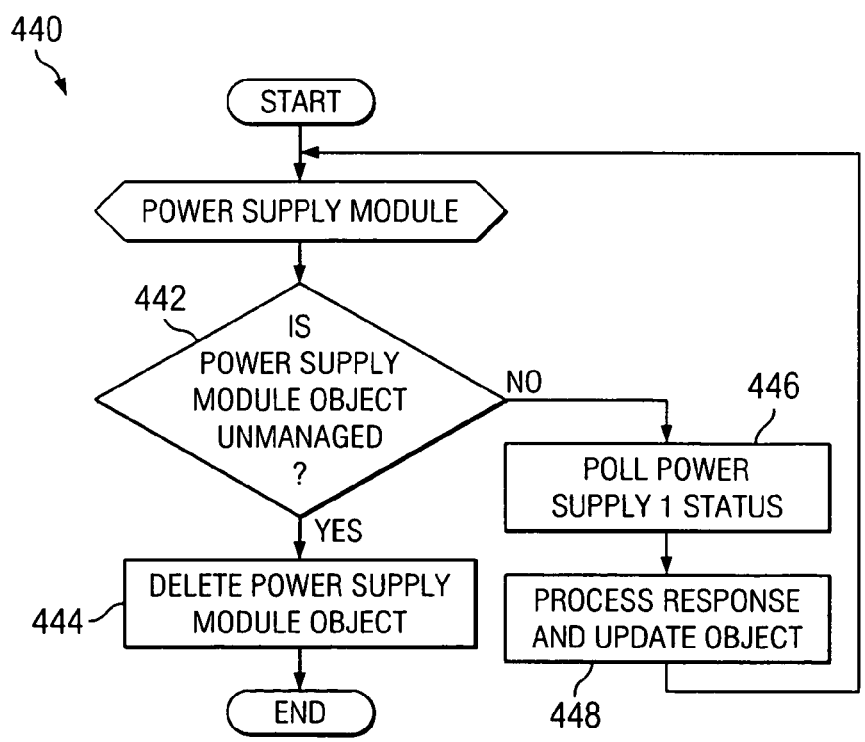

FIG. 4C illustrates the power supply object executing example method 440, which equally applies to the power supply 1 and 2 objects. Method 440 begins at step 442 where chassis monitoring engine 132 determines whether the power supply object is unmanaged. If the power supply object is unmanaged, then the power supply module object is deleted at step 444. If the power supply object is managed, then the power supply status of the selected switch 118 is polled at step 446. At step 448, the power supply object processes the response from the selected switch 118 and updates the object.

Figure 4D:
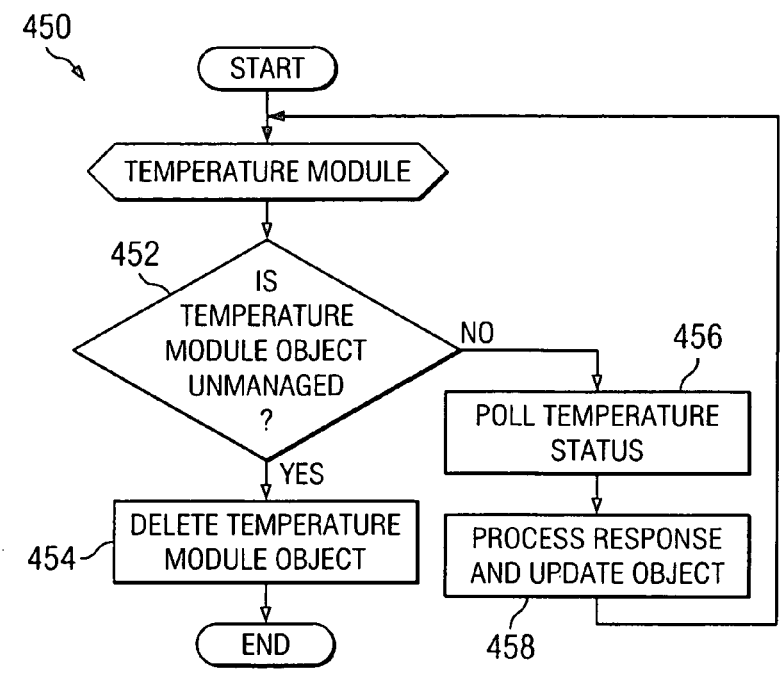

FIG. 4D illustrates the temperature object executing example method 450. Method 450 begins at step 452 where chassis monitoring engine 132 determines whether the temperature object is unmanaged. If the temperature object is unmanaged, then the temperature module object is deleted at step 454. If the temperature object is managed, then, at step 456, the selected switch 118 is polled for the temperature status. At step 458, the temperature object processes responses from the selected switch 118 and updates the object.

Figure 4E:
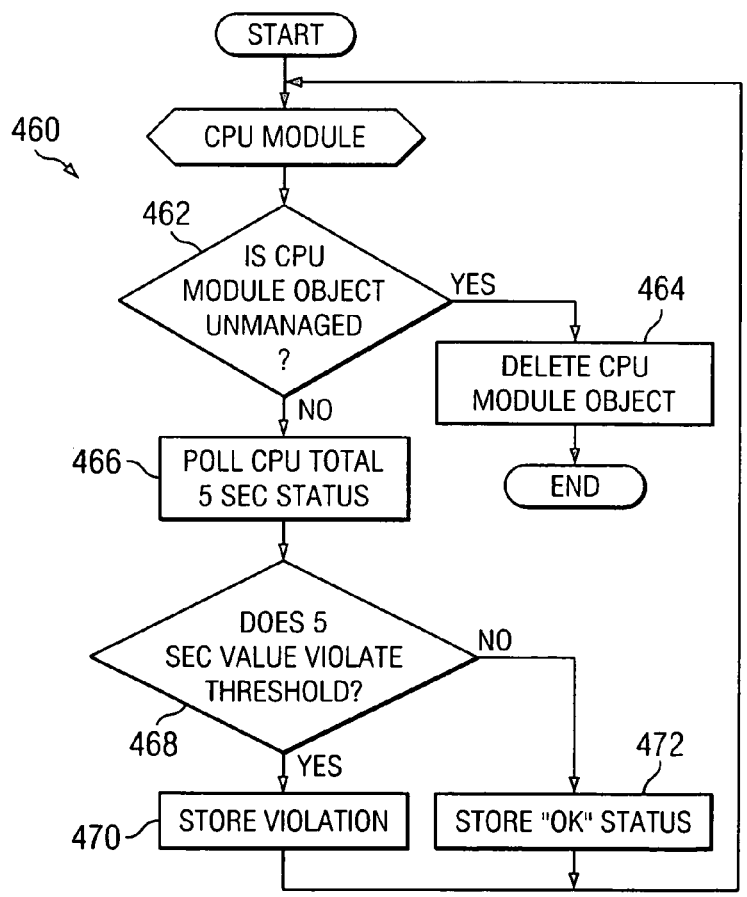

FIG. 4E illustrates CPU object executing example method 460. Method 460 begins at step 462 where chassis monitoring engine 132 determines whether the CPU object is unmanaged. If the CPU object is unmanaged, then, at step 464, the CPU object is deleted. If the CPU object is managed, then, at step 466, the CPU is polled for a total of five seconds to determine a five-second status. At decisional step 468, the CPU object determines whether the five-second status has violated a threshold value. If the threshold has been violated, then, at step 470, the violation is stored in memory 120. If no violation has occurred, then "Okay" status is stored at step 472.

Figure 4F:
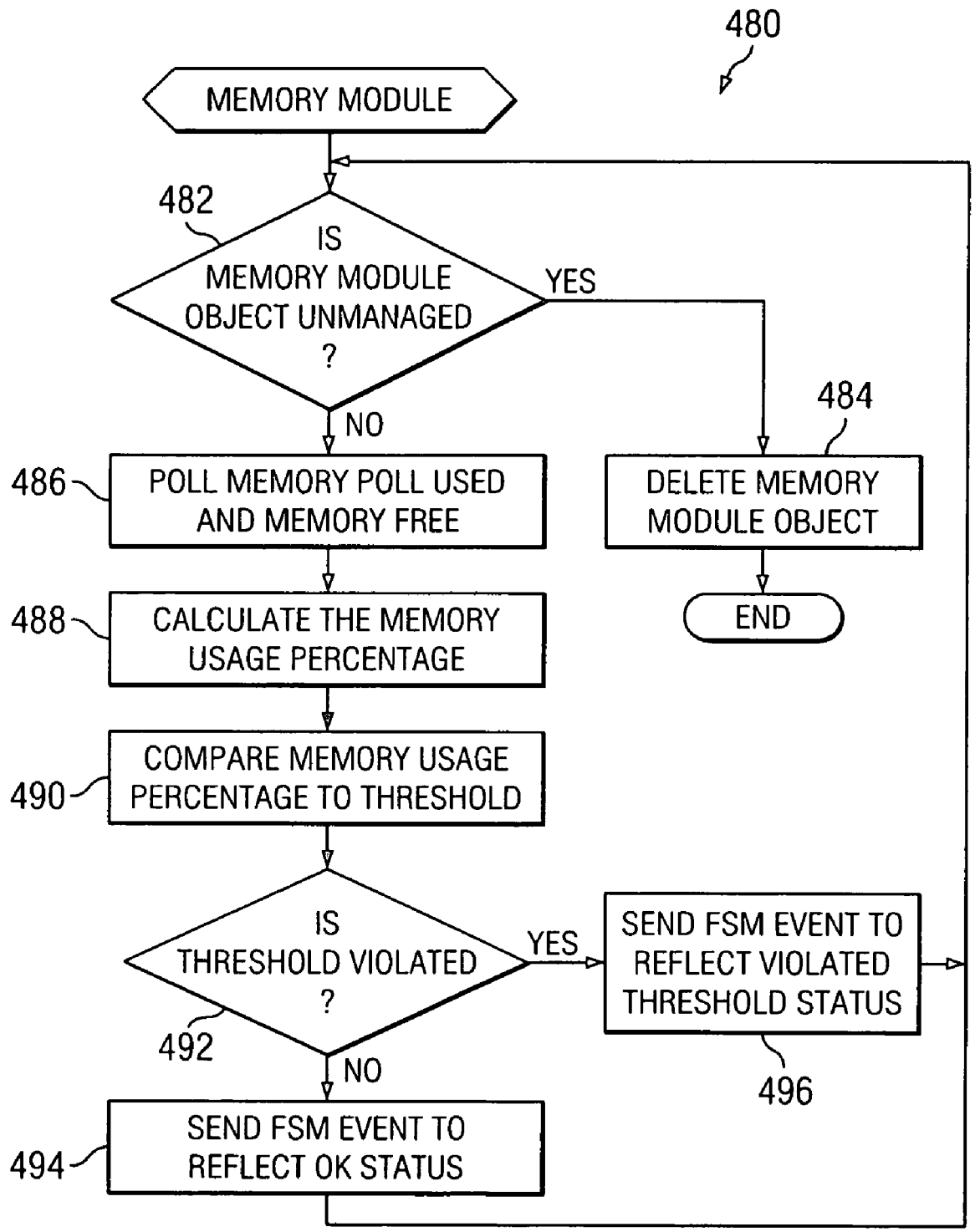

FIG. 4F illustrates memory module object executing example method 480. Method 480 begins at step 482 where chassis monitoring engine 132 determines whether the memory module object is unmanaged. If the memory module object is unmanaged, then, at step 484, the memory module object is deleted. If the memory module object is managed, then, at step 486, the memory is polled for used and free memory statuses. At step 488, the memory usage percentage is calculated. Next, at step 490, the memory usage percentage is compared to a threshold. At decisional step 492, if the threshold is violated, then a FSM event is sent to reflect "Okay" status at step 494. If the threshold is violated, then, at step 496, a FSM event is sent to reflect violation of the threshold status.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A method for agent-based monitoring of network devices, comprising:

discovering, by a hardware processor in a computer, a plurality of network devices in a network, wherein each of the network devices discovered in the network include one or more Management Information Base (MIB) objects that identify a type and a plurality of hardware characteristics for the respective network device discovered in the network;

transmitting a Simple Network Management Protocol (SNMP) request to each of the discovered network devices to obtain the Management Information Base (MIB) objects from each respective network device discovered in the network;

loading, by the hardware processor in the computer, a plurality of agent templates corresponding to the discovered network devices, wherein:

each of the agent templates comprise an agent construct that includes a class hierarchy having a plurality of class definitions, the plurality of class definitions in the class hierarchy comprise one or more parent classes that include the types for the discovered network devices, and the plurality of class definitions in the class hierarchy further comprise one or more child classes associated with the one or more parent classes, the one or more child classes including the plurality of hardware characteristics for the discovered network devices;

selecting one of the discovered network devices as a network device to be monitored;

selecting one of the plurality of agent templates based on the network device selected to be monitored;

instantiating, by the computer, a plurality of agent objects from the class definitions for the selected one of the plurality of agent templates, wherein the plurality of instantiated agent objects correspond to the plurality of hardware characteristics for the selected network device, and wherein the plurality of instantiated agent objects monitor the plurality of hardware characteristics for the selected network device;

retrieving, by the plurality of instantiated agent objects, information associated with each of the plurality of monitored hardware characteristics for the selected network device;

comparing, by the plurality of instantiated agent objects, the retrieved information associated with each of the plurality of monitored hardware characteristics to a respective threshold value; and automatically communicating, by the computer, an alert to a user of the computer in response to the retrieved information for one or more of the monitored hardware characteristics violating the respective threshold value.

2. The method of claim 1, wherein the plurality of hardware characteristics for the discovered network devices include one or more of a vendor identity, a model number, or a product line.

3. The method of claim 1, wherein the plurality of hardware characteristics for the discovered network devices include one or more of memory usage, chassis temperature, Central Processing Unit (CPU) usage, fan status, module status, or power supply status.

4. The method of claim 1, wherein the plurality of class definitions in the class hierarchy for the selected one of the plurality of agent templates include a network addressable unit class corresponding to the type for the selected network device and an agent level class that comprises a root class within the class hierarchy, the agent level root class having a class declaration that includes a parent clause listing the network addressable unit class corresponding to the type for the selected network device.

5. The method of claim 4, wherein the plurality of class definitions in the class hierarchy for the selected one of the plurality of agent templates further include one or more group level classes and a plurality of instance level classes, the one or more group level classes defining child classes associated with the agent level root class and logically grouping the plurality of instance level classes.

6. A computer for agent-based monitoring of network devices, the computer comprising at least one hardware processor that executes computer-executable instructions on the processing device that cause the hardware processor to:

discover, by the hardware processor, a plurality of network devices in a network, wherein each of the network devices discovered in the network include one or more Management Information Base (MIB) objects that identify a type and a plurality of hardware characteristics for the respective network device discovered in the network;

transmit a Simple Network Management Protocol (SNMP) request to each of the discovered network devices to obtain the Management Information Base (MIB) objects from each respective network device discovered in the network;

load, by the hardware processor, a plurality of agent templates corresponding to the discovered network devices, wherein:

each of the agent templates comprise an agent construct that includes a class hierarchy having a plurality of class definitions, the plurality of class definitions in the class hierarchy comprise one or more parent classes that include the types for the discovered network devices, and the plurality of class definitions in the class hierarchy further comprise one or more child classes associated with the one or more parent classes, the one or more child classes including the plurality of hardware characteristics for the discovered network devices;

select one of the discovered network devices as a network device to be monitored;

select one of the plurality of agent templates based on the network device selected to be monitored;

instantiate, by the hardware processor, a plurality of agent objects from the class definitions for the selected one of the plurality of agent templates, wherein the plurality of instantiated agent objects correspond to the plurality of hardware characteristics for the selected network device, and wherein the plurality of instantiated agent objects monitor the plurality of hardware characteristics for the selected network device;

retrieve, by the plurality of instantiated agent objects, information associated with each of the plurality of monitored hardware characteristics for the selected network device;

compare, by the plurality of instantiated agent objects, the retrieved information associated with each of the plurality of monitored hardware characteristics to a respective threshold value; and automatically communicate, by the hardware processor, an alert to a user of the computer in response to the retrieved information for one or more of the monitored hardware characteristics violating the respective threshold value.

7. The computer of claim 6, wherein the plurality of hardware characteristics for the discovered network devices include one or more of a vendor identity, a model number, or a product line.

8. The computer of claim 6, wherein the plurality of hardware characteristics for the discovered network devices include one or more of memory usage, chassis temperature, Central Processing Unit (CPU) usage, fan status, module status, or power supply status.

9. The computer of claim 6, wherein the plurality of class definitions in the class hierarchy for the selected one of the plurality of agent templates include a network addressable unit class corresponding to the type for the selected network device and an agent level class that comprises a root class within the class hierarchy, the agent level root class having a class declaration that includes a parent clause listing the network addressable unit class corresponding to the type for the selected network device.

10. The computer of claim 9, wherein the plurality of class definitions in the class hierarchy for the selected one of the plurality of agent templates further include one or more group level classes and a plurality of instance level classes, the one or more group level classes defining child classes associated with the agent level root class and logically grouping the plurality of instance level classes.

11. A system for agent-based monitoring of network devices discovered in an enterprise network, the system comprising one or more hardware processors that:
  discover, by the one or more hardware processors, a plurality of network devices in a network, wherein each of the network devices discovered in the network include one or more Management Information Base (MIB) objects that identify a type and a plurality of hardware characteristics for the respective network device discovered in the network;
  transmit a Simple Network Management Protocol (SNMP) request to each of the discovered network devices to obtain the Management Information Base (MIB) objects from each respective network device discovered in the network;
  load, by the one or more hardware processors, a plurality of agent templates corresponding to the discovered network devices, wherein:
    each of the agent templates comprise an agent construct that includes a class hierarchy having a plurality of class definitions,
    the plurality of class definitions in the class hierarchy comprise one or more parent classes that include the types for the discovered network devices, and
    the plurality of class definitions in the class hierarchy further comprise one or more child classes associated with the one or more parent classes, the one or more child classes including the plurality of hardware characteristics for the discovered network devices;
  select one of the discovered network devices as a network device to be monitored;
  select one of the plurality of agent templates based on the network device selected to be monitored;
  instantiate, by the one or more hardware processors, a plurality of agent objects from the class definitions for the selected one of the plurality of agent templates, wherein the plurality of instantiated agent objects correspond to the plurality of hardware characteristics for the selected network device, and wherein the plurality of instantiated agent objects monitor the plurality of hardware characteristics for the selected network device;
  retrieve, by the plurality of instantiated agent objects, information associated with each of the plurality of monitored hardware characteristics for the selected network device;
  compare, by the plurality of instantiated agent objects, the retrieved information associated with each of the plurality of monitored hardware characteristics to a respective threshold value; and
  automatically communicate, by the one or more hardware processors, an alert to a user of the computer in response to the retrieved information for one or more of the monitored hardware characteristics violating the respective threshold value.

12. The system of claim 11, wherein the plurality of hardware characteristics for the discovered network devices include one or more of a vendor identity, a model number, or a product line.

13. The system of claim 11, wherein the plurality of hardware characteristics for the discovered network devices include one or more of memory usage, chassis temperature, Central Processing Unit (CPU) usage, fan status, module status, or power supply status.

14. The system of claim 11, wherein the plurality of class definitions in the class hierarchy for the selected one of the plurality of agent templates include a network addressable unit class corresponding to the type for the selected network device and an agent level class that comprises a root class within the class hierarchy, the agent level root class having a class declaration that includes a parent clause listing the network addressable unit class corresponding to the type for the selected network device.

15. The system of claim 14, wherein the plurality of class definitions in the class hierarchy for the selected one of the plurality of agent templates further include one or more group level classes and a plurality of instance level classes, the one or more group level classes defining child classes associated with the agent level root class and logically grouping the plurality of instance level classes.

16. A method for agent-based monitoring of switches, comprising:
  discovering, by a hardware processor in a computer, a plurality of switches in a network, wherein each of the switches discovered in the network include one or more Management Information Base (MIB) objects that identify a type and a plurality of hardware characteristics for the respective switch discovered in the network;
  transmitting a Simple Network Management Protocol (SNMP) request to each of the discovered switches to obtain the Management Information Base (MIB) objects from each respective switch discovered in the network;
  loading, by the hardware processor in the computer, a plurality of agent templates corresponding to the discovered switches, wherein:
    each of the agent templates comprise an agent construct that includes a class hierarchy having a plurality of class definitions,
    the plurality of class definitions in the class hierarchy comprise one or more parent classes that include the types for the discovered switches, and
    the plurality of class definitions in the class hierarchy further comprise one or more child classes associated with the one or more parent classes, the one or more child classes including the plurality of hardware characteristics for the discovered switches;
  selecting one of the discovered switches as a switch to be monitored;
  selecting one of the plurality of agent templates based on the switch selected to be monitored;
  instantiating, by the computer, a plurality of agent objects from the class definitions for the selected one of the plurality of agent templates, wherein the plurality of instantiated agent objects correspond to the plurality of hardware characteristics for the selected switch, and wherein the plurality of instantiated agent objects monitor the plurality of hardware characteristics for the selected switch;

retrieving, by the plurality of instantiated agent objects, information associated with each of the plurality of monitored hardware characteristics for the selected switch; and comparing, by the plurality of instantiated agent objects, the retrieved information associated with each of the plurality of monitored hardware characteristics to a respective threshold value; and automatically communicating, by the computer, an alert to a user of the computer in response to the retrieved information for one or more of the monitored hardware characteristics violating the threshold value.

17. The method of claim 16, wherein the plurality of hardware characteristics for the discovered switches include one or more of a vendor identity, a model number, or a product line.

18. The method of claim 16, wherein the plurality of class definitions in the class hierarchy for the selected one of the plurality of agent templates include a network addressable unit class corresponding to the type for the selected switch and an agent level class that comprises a root class within the class hierarchy, the agent level root class having a class declaration that includes a parent clause listing the network addressable unit class corresponding to the type for the selected switch.

19. The method of claim 18, wherein the plurality of class definitions in the class hierarchy for the selected one of the plurality of agent templates further include one or more group level classes and a plurality of instance level classes, the one or more group level classes defining child classes associated with the agent level root class and logically grouping the plurality of instance level classes.

* * * * *